UNITED STATES PATENT OFFICE.

ALEXIS P. ZARIN, OF MOSCOW, RUSSIA.

IMPROVEMENT IN PROCESSES OF PREPARING DISTILLERY-MASH.

Specification forming part of Letters Patent No. 176,117, dated April 11, 1876; application filed January 5, 1876.

*To all whom it may concern:*

Be it known that I, ALEXIS PETROVITSCH ZARIN, of the city of Moscow, in the Empire of Russia, have invented a new and useful Process for Preparing Distillery-Mash, which process is fully set forth in the following specification:

This invention relates to that class of processes employed for preparing distillery-mash directly from grain or raw potatoes; and it consists in obtaining first a fresh starchy solution directly from grain or raw potatoes at a low temperature, and at an ordinary atmospheric pressure, and in the preparing of distillery-mash thereof.

In carrying out my invention of preparing mash from grain, the quantity of grain wanted for mashing is washed, in order to remove all unsound grain, dust, dirt, and other impurities. This washing can be done in different manners, although I prefer for this purpose the machine used in sugar-refineries for washing animal charcoal. The washed grain is put in water, wherein the same is left, according to the degree of its dryness, from twenty-four to thirty hours. After the expiration of this time, when the grain is sufficiently soft, it is washed again with water and then bruised by some apparatus, as, for instance, the ordinary grain-bruiser employed for crushing green malt. On the bruised grain water is poured again in such quantity as to obtain for every one-third of a hundred-weight of grain employed for the mash about eleven gallons of the whole compound. This operation (the second soaking) is performed during three or four hours, either in the mashing-vat itself, or, better still, in tubs placed above the mashing-vat, constantly stirring the mass by a stirring apparatus of any suitable construction placed in the tubs, or simply by hand-ladles. By this latter soaking the starch of the grain is completely separated and cleansed from the husk; the liquid resembles a thick milk—*i. e.*, clean corn-starch is obtained. After the second soaking of the bruised mass the same is put into the mashing-vat, mixed with malt (green malt preferable) in the proportion of fifteen per cent. to the weight of the dry grain employed, and with water, the quantity of which depends on the different proportions of water used in distilleries for the same quantity of grain, and is then boiled in the ordinary manner of boiling mash.

In preparing mash from potatoes according to my invention, the raw potatoes are washed and then grated by graters employed in potato-starch manufactories. On the grated mass water is poured for removing the peels, and the raw potato-starch thus obtained, and diluted in water, is put into the mashing-vat, together with bruised green malt, in the same proportion as for the grain, (counting each hundred-weight of grain equal to three hundred-weights of potatoes,) and then boiled, as is commonly done with mashes. The temperature of water for soaking the grain, the bruised mass of it, (second soaking,) and the grated potatoes must not exceed 61° to 62° Fahrenheit, in order to prevent the formation of organic acids, acting very injuriously during the further process of formation and fermentation of the wort. For the better separating the starch from the husks of the grain, and for crushing the starch-grains, the soaked mass of bruised grain or grated potatoes and bruised green malt, before entering the mashing-vat, must pass through a preparatory mashing-machine, (vormaisch-machine,) known to every distiller. The mashing mass containing a great quantity of starch, it is necessary, in order not to leave a part of the latter unboiled, to boil such mass as slowly as possible, raising the temperature to 149° to 152° Fahrenheit, with several intervals, viz: At first the temperature of the mash is speedily raised to about 127° Fahrenheit, whereupon the boiling is suspended for about fifteen minutes; then the temperature is gradually raised to 143° Fahrenheit, and then the boiling again interrupted for an equal space of time; lastly, the temperature is raised to about 152° Fahrenheit, whereupon the boiling is finished. The motion of the mashing-machine is stopped about five minutes after the boiling is ended, and the mash left undisturbed for about an hour, in order that the process of saccharization might completely take place.

It is, however, to be observed that the aforementioned mode of boiling mash may be altered according to the quality of water employed.

Before letting the mash into the cooler, it must again be stirred, because, during the last repose, all the bran contained in the same will come in a thick mass to the top of the tub.

The wort thus boiled comes out much cleaner and clearer, and contains incomparably more grape-sugar, (glucose,) than wort boiled of an equal quantity of flour, viz: By experiments it was found that wort prepared according to the foregoing method contains twenty-eight per cent. grape-sugar, (according to the saccharometer of Balling,) while mash made even of first quality of fine rye-flour did never contain more than twenty per cent. of grape-sugar. Being filtered through a fine sifter or coarse linen, this mash leaves nothing else except the husks of the grain completely free from any starch, which is not only not obtained, but not even expected, of flour or potato mash prepared after the methods existing up to the present time. In consequence of the abundance of sugar in the wort boiled in the aforesaid manner, by employing good strong yeast, and by regular fermentation, more than fifty per cent. alcohol can be obtained per one third of a hundred-weight of rye thrashed in dry weather, which, by the ordinary method, is not obtained even from the best qualities of bolted rye-flour.

My method of preparing mash is particularly useful for distilleries producing dry yeast, and where considerable proportions of water are used for the same quantity of grain. The aforesaid method of preparing distillery-mash is equally adapted for distilling alcohol from rice, maize, and generally all species of grain and rhizocarpic plants containing starch.

The foregoing description shows that the principal advantage of the proposed method consists in its simplicity and cheapness, rendering superfluous all corn-kilns, mills, corn cleaning and sorting machines, and likewise wanting no potato-boiler. Besides, my method completely prevents the formation, in mash, of flour-clods as well as raw agglomerations of potatoes and raw particles of starch sticking to the corn-husks, which commonly spoil the wort and obstruct the distilling apparatus. Therefore, the mash prepared by my method must necessarily yield a considerably greater quantity of grape-sugar, and consequently also of alcohol, than mashes prepared in any other manner.

In employing my method of preparing distillery-mash, the bran may be totally and completely separated from the wort. For this purpose it is sufficient to cover the outlets of the fermenting-vat with metallic strainers before the wort passes into the distilling apparatus, and all bran will remain in the fermenting-vat. For preventing a loss of alcohol, the bran remaining in the said vat must be washed through with water. The washed grain being free of dirt, unsound grains, and overheated starchy particles, ordinarily found in flour, the alcohol obtained by my method appears pure and nearly quite free from fusel-oil..

I claim as my invention—

The within-described process of preparing distillery-mash—that is to say, first soaking grain in water, and bruising this soaked grain, and then again soaking the mass in water at a low temperature of about 61° Fahrenheit, and mixing the starchy paste thus obtained with the malt, all substantially in the manner described.

In testimony whereof I have signed my name to this specification in the presence of two subscribing witnesses.

ALEXIS PETROVITSCH ZARIN.

Witnesses:
N. TSHEKALOFF,
C. L. F. VOSS.